United States Patent [19]
Rhodes et al.

[11] Patent Number: 5,398,140
[45] Date of Patent: Mar. 14, 1995

[54] DIGITAL DATA TAPE STORAGE AUTOMATIC TRACK FOLLOWER SYSTEM

[75] Inventors: Edward J. Rhodes; David R. Lee, both of San Jose; Theodore D. Rees, Mountain View, all of Calif.

[73] Assignee: R-Byte, Inc., San Jose, Calif.

[21] Appl. No.: 741,088

[22] Filed: Aug. 6, 1991

[51] Int. Cl.6 .......................... G11B 5/09; G11B 5/584
[52] U.S. Cl. ................................... 360/48; 360/77.14
[58] Field of Search ................... 360/32, 48, 49, 72.1, 360/72.2, 77.01, 51, 77.12–77.15

[56] References Cited

U.S. PATENT DOCUMENTS

| | | | |
|---|---|---|---|
| 3,838,453 | 9/1974 | Buslik et al. | 360/70 |
| 3,860,960 | 1/1975 | Akamine | 360/85 |
| 3,883,785 | 5/1975 | Fulcher et al. | 318/314 |
| 4,060,840 | 11/1977 | Umeda | 360/130 |
| 4,258,399 | 3/1981 | Iijima et al. | 360/85 |
| 4,408,235 | 10/1983 | Ito | 360/71 |
| 4,410,919 | 10/1983 | Umeda | 360/85 |
| 4,459,625 | 7/1984 | Kawase | 360/85 |
| 4,510,534 | 4/1985 | Maeda | 360/10.3 |
| 4,541,024 | 9/1985 | Seiben | 360/85 |
| 4,599,561 | 7/1986 | Takahashi et al. | 324/208 |
| 4,740,850 | 4/1988 | Ogata | 360/85 |
| 4,742,407 | 5/1988 | Smith et al. | 360/95 |
| 4,758,398 | 7/1988 | Nishida et al. | 360/85 |
| 4,800,450 | 1/1989 | Rodal et al. | 360/73.06 |
| 4,833,549 | 5/1989 | Yoshimoto et al. | 360/19.1 |
| 4,835,629 | 5/1989 | Ueno et al. | 360/53 |
| 4,873,589 | 10/1989 | Inazawa et al. | 360/53 |
| 4,891,644 | 1/1990 | Noro | 360/77.01 |
| 4,899,233 | 2/1990 | Yoshida | 360/77.14 |
| 4,910,448 | 3/1990 | Tomisawa et al. | 318/599 |
| 4,939,595 | 7/1990 | Yoshimoto et al. | 360/19.1 |
| 5,008,764 | 4/1991 | Yoshida et al. | 360/77.14 |

Primary Examiner—Donald Hajec
Assistant Examiner—Won Tae C. Kim
Attorney, Agent, or Firm—Lyon & Lyon

[57] ABSTRACT

An automatic track follower (ATF) system for accurately positioning the read/write head on the tracks of a magnetic tape comprises a pilot signal generator for generating pilot signals from tape pilot marks; a sample-and-hold circuit for sampling the pilot signals from the tracks immediately adjacent a track being read; a comparator for comparing the magnitudes of the pilot signals from adjacent tracks on both sides of the track being read; a correction circuit for centering the read/write head on the track being read; and a processor for digitally controlling the generator, sample-and-hold circuit, comparator, and correction circuit and their functions, the digital control being under programmable control. Three code bit fields are discriminated from the digital data to detect the beginning of the ATF field on the tape to derive the ATF logic, timing, and control functions.

7 Claims, 8 Drawing Sheets

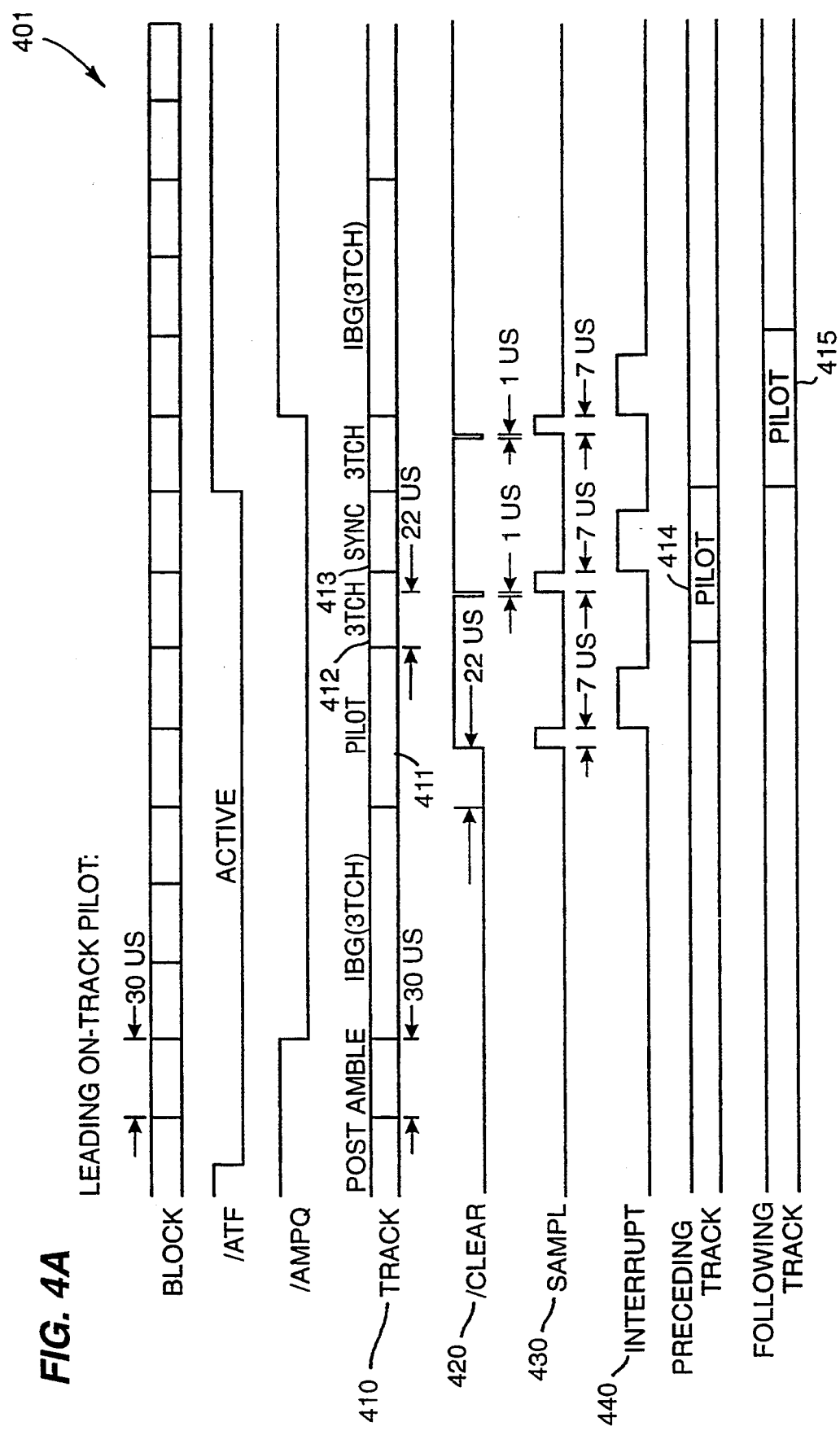

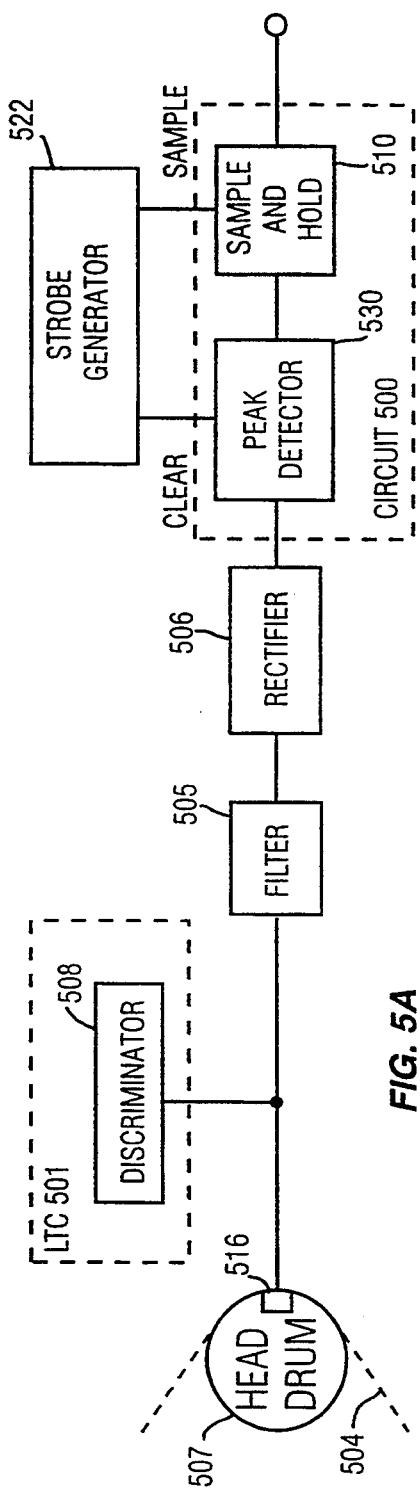
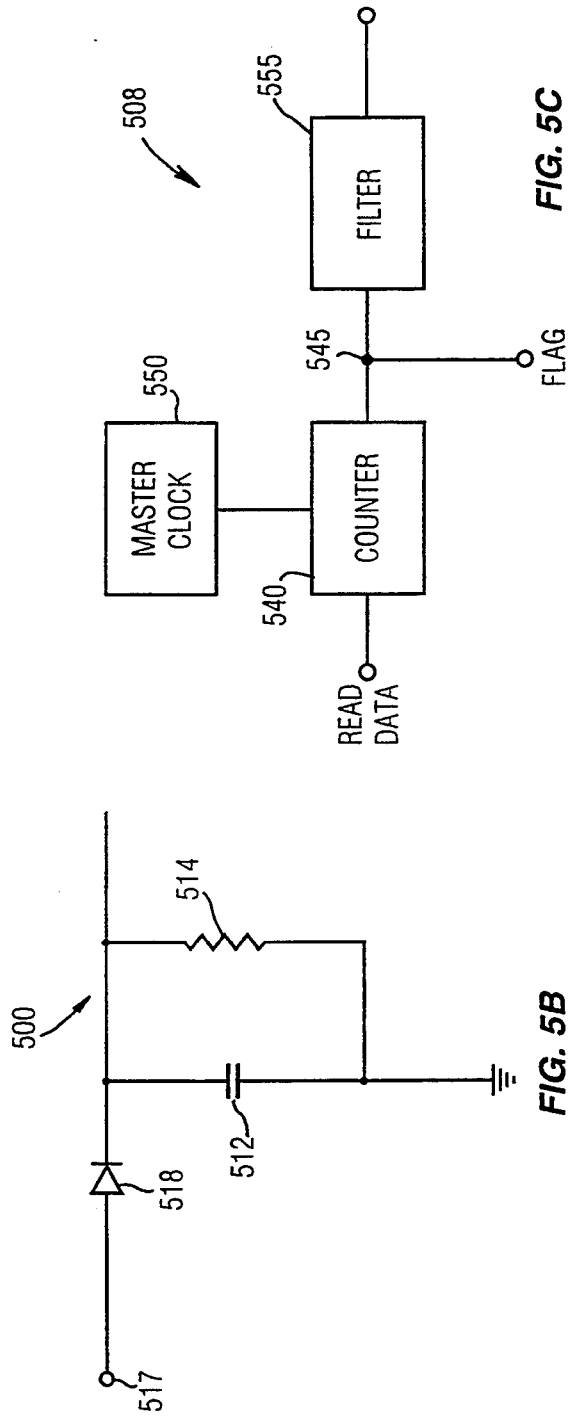
FIG. 5A
FIG. 5B
FIG. 5C

DIGITAL DATA TAPE STORAGE AUTOMATIC TRACK FOLLOWER SYSTEM

FIELD OF THE INVENTION

The present invention relates generally to the field of digital data tape storage Systems and more particularly to automatic track follower systems for digital data systems.

BACKGROUND OF THE INVENTION

Automatic track following (ATF) provides precise tracking for magnetic tape read/write operations to insure accuracy of information transfer. Standard format tapes contain ATF marks for detection by ATF systems.

A standard format for digital data storage (DDS) using 3.81 mm digital audio tape (DAT) magnetic tape is set forth by the European Computer Manufacturers Association in the document "Flexible Magnetic Media for Digital Data Interchange" (ISO/IEC JTC 1/SC 11 N 1026, hereinafter "DDS standard", Jul. 13, 1990).

Briefly, DDS format data has two types of separator marks indicating logical separations of the data. Separator 1 is a "file mark" and separator 2 is a "set mark". User data, separator marks, and associated information are formed into groups occupying groups of tracks in a "main zone" of the track. Additional information about the contents of the group, the location of the tracks and the contents of the tracks is recorded in two parts of each track called "sub zones". The two sub zones constitute the "sub data" area of the track. In addition, there are margin zones at the extreme ends of the tape and Automatic Track Finding (ATF) zones between the sub zones and the main zone. Each zone in a track is further segmented into blocks called margin blocks (in the margin zone), preamble, sub data, and postamble blocks (in the sub zones), spacer and ATF blocks (in the ATF zone), and preamble and main data blocks (in the main zone). A "frame" is a pair of adjacent tracks with azimuths of opposite polarity (where the azimuth is the angle between the mean flux transition line with a line normal to the centerline of the track). Data to be recorded is grouped into "basic groups" of 126632 bytes stored in 22 frames. Each basic group is identified by a running number from 1 to 65535. Data and separator marks are grouped into the basic groups starting with basic group no. 1. Error Correction Codes (ECC), termed C1 and C2, are computed bytes added into the data fields. ECC C3 is one extra frame added to the 22 frame groups and is capable of correcting any two tracks in a group which are bad.

Coding on magnetic tape is performed by a formatter device which codes and writes bits represented by magnetic flux reversals on a ferromagnetic tape medium. There are many different types of coding used, varying according to polarities (return to zero or not), bit train compression, and clocking capability. The most common coding schemes for high-performance tapes are non-return-to-zero-inverted (NRZI), phase encoding (PE), and group coded recording (GCR), which is a combination of NRZI and PE. A code is self-clocking if a signal pulse is generated for every stored bit.

Write data channel functions, including coding and error correction code, are typically performed by a controller operating through a write amplifier positioned near the write head. The write amplifier drives the write current through the write head.

Read data channel functions, including amplification and equalization of the read signals and data retrieval, are typically performed by automatic track-oriented gain-adjustment by a read amplifier and timing, deskewing, decoding, error detection and correction by a controller. The fundamental function of readback is to accurately convert the amplified read signal waveform into its binary equivalent. During writing, an external clock (oscillator) spaces recorded bits. An accurate readback therefore must be synchronous, and a code which inherently strobes the readback signal is desirable, such as self-clocking pulse generation in PE and GCR. One form of coding used in digital data audio tape storage is so-called 8-10 conversion GCR.

The purpose of automatic track finding (ATF) is to provide tape positioning accuracy for read/write operations. ATF blocks are allocated to two zones of a track: the ATF zone 1 and the ATF zone 2 preceding and following the main zone, respectively. ATF blocks are preceded and followed by three spacer blocks and consist of 360 channel bits. Each ATF zone consists of a combination of four signals having different channel bit patterns recorded at different physical recording densities. These signals are: (1) ATF pilot signal f1 which has a repeat pattern of 1 followed by 35 zeros; (2) AFT sync signal f2 (100000000, recorded only on track 1); (3) ATF sync signal f3 (100000, recorded only on track 2); and (4) ATF space signal f4 (100). An example of a tracking error detection procedure is: First, the frequency and length of the ATF sync signal is detected. Next crosstalk from the ATF pilot signal of an adjacent track is sampled. A fixed period later, the crosstalk signal from the ATF pilot signal of the other adjacent track is sampled. The tracking error is the difference between the levels of those two crosstalk signals. (Note that track 1=track A=+azimuth track and track 2=track B=−azimuth track.)

Conventional ATF circuits utilize an analog band pass filter to detect the tracking sync mark (f2 on A tracks, f3 on B tracks). The sync marks are detected within the ATF field. Once the tracking sync mark is detected, a series of timing signals are generated for sample-and-hold circuits. Separate sample-and-hold stages are used to capture the levels of the pilot signal (f1) crosstalk from the two adjacent tracks. An op amp and a final sample-and-hold stage capture the difference between the two pilot signals, generating the tracking servo error signal for a servo loop implemented in analog circuits. In the case of non-ideal track-to-track positioning, timing strobes from the detection of the sync signal may result in incorrect samples. In fact, under the worst case track-to-track offsets, the pilot signal of the prior track will be missed completely and the pilot signal of the following track will be sampled twice, thereby injecting erroneous information into the tracking servo loop. Also, the sync signal may arrive before the prior track pilot sample is closed, and a sync signal shock wave from the sync signal through the pilot filter will produce an erroneous offset in the ATF servo loop.

SUMMARY OF THE INVENTION

Accordingly, it is a principal object of the present invention to provide an improved ATF system. A further object of the present invention is to provide an automatic track follower apparatus and method achieving the higher requirements suitable for digital data tape storage systems.

This invention is an automatic track follower (ATF) system operating in a digital data tape storage system having a controller/formatter for controlling the data flow and coding the data, a read/write channel in communication with a read/write head, and a driver for transporting and controlling a magnetic tape having data tracks and pilot marks over the read/write head. The ATF system of the present invention is coupled to the controller/formatter, the driver, and the read/write channel, for accurately positioning the read/write head on the tracks of the magnetic tape. The ATF system of this invention comprises pilot signal generating means, coupled to the read/write channel, for generating pilot signals from the pilot marks; sampling means, coupled to the pilot signal generating means, for sampling the pilot signals from the tracks immediately adjacent a track being read; comparator means, coupled to the sampling means, for comparing the magnitudes of the pilot signals from adjacent tracks on both sides of the track being read; correction means, coupled to the driver, for centering the read/write head on the track being read; and processor means, coupled to the pilot signal generating means, to the sampling means, to the comparator means, and to the correction means, for digitally controlling the generator, sampling, comparator, and correction means and their functions, the digital control being under programmable control.

The ATF system of the present invention detects the sync signal digitally. This provides more reliable sync detection while eliminating the cost and complexity of the analog band pass filter of conventional systems. Timing strobes for the sample-and-hold circuit are timed from the beginning of the ATF area, not from detection of the sync signal as in conventional systems. Samples are timed such that accurate samples are guaranteed even under conditions of worst case track-to-track positioning. Further, the sample window for the prior track pilot signal is closed before the sync signal arrives, thereby eliminating the shock wave of the sync signal through the pilot low pass filter as a source of an offset in the ATF servo loop. A single sample-and-hold circuit is used for all samples, thereby eliminating another source of offsets and the complexity of the multiple stages of conventional systems. The output of the single sample-and-hold circuit is coupled directly to a processor through an ADC and all subsequent processing is performed by the processor's firmware. The tracking servo is implemented completely in software so it can more comprehensive and flexible than an analog servo while being less costly, easier to manufacture, and requiring no manual adjustments. In terms of overall performance, the present invention provides faster track acquisition, a higher bandwidth track finding servo, and greater tolerance of shock and vibration.

A further understanding of the nature and advantages of the present invention may be realized by reference to the Detailed Description of the Invention and the attached drawings.

BRIEF DESCRIPTION OF THE DRAWINGS

FIG. 5A is a schematic block diagram showing a detecting and sampling circuit in one embodiment of the present invention.

FIG. 5B is a schematic diagram of a circuit combining the functions of a peak detector and a sample-and-hold circuit according to the present invention.

FIG. 5C is a schematic block diagram of an embodiment of a discriminator for detecting the 3Tch fields according to the present invention.

DETAILED DESCRIPTION OF THE INVENTION

Figure 1:
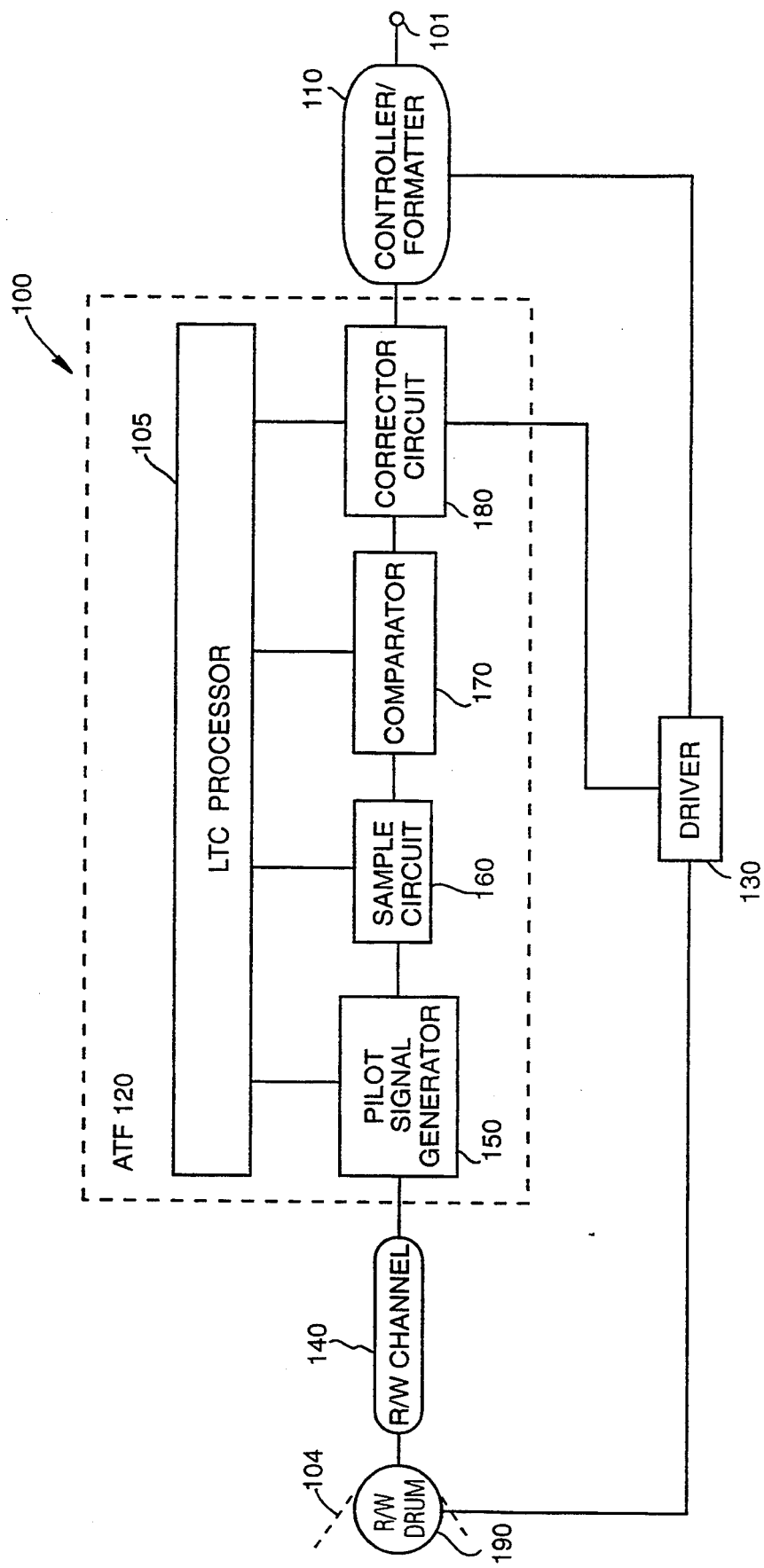
FIG. 1 is a schematic block diagram showing an automatic track finding (ATF) system in a Digital Data Storage Tape (DDS) system according to the present invention.

FIG. 1 is a schematic block diagram showing an automatic track finding (ATF) system 120 in a Data Storage/Digital Audio Tape (DDS/DAT) tracking servo loop system 100 according to the present invention. A host device (not shorn) is coupled at 101 to controller/formatter 110 which is coupled to ATF 120. ATF 120 is coupled to a driver 130. Driver 130 includes the supply and take-up reels, capstan, drum head and their motors, sensors, and encoders for controlling the tape motion. ATF 120 is further coupled to a read/write (R/W) channel 140 which in turn is coupled to a read/write (R/W) drum 190. R/W drum 190 is in communication with a magnetic tape 104. ATF 120 includes a pilot signal generator 150 coupled to R/W channel 140, a sampling circuit 160 coupled to pilot signal generator 150, a comparator 170 coupled to sampling circuit 160, a correcting circuit 180 coupled to comparator 170 and to driver 130. A processor 105 is coupled to pilot signal generator 150, sample circuit 160, comparator 170, and corrector circuit 180.

In operation, data to be stored in magnetic tape 104 or communicated to a host device at 101 are written on or read from magnetic tape 104 which is in communication with R/W drum 190. Tracking servo loop 100 provides control over write/read operations by means of software/firmware-controlled direct-drive motors in driver 130 which precisely control tape motion, speed, and tension through R/W drum 190 served by R/W channel 140 and controlled by ATF 120 and controller/formatter 110.

ATF 120 provides automatic track finding based on the DDS standard. ATF 120 is part of tracking system 100 providing control over R/W drum 190 to follow the closely spaced tracks on the tape during a read operation. During write operations, driver 130 records tracking servo bursts called pilot signals in the ATF areas near the beginning and end of each track of the tape. During read operations, controller/formatter 110 samples the pilot signals from the tracks on each side of the currently read track and compares magnitudes. If the magnitude of the pilot signals from the two tracks are not equal, it is an indication that read drum 190 is not centered on the track and a correction can be applied by corrector circuit 180.

Figure 2:
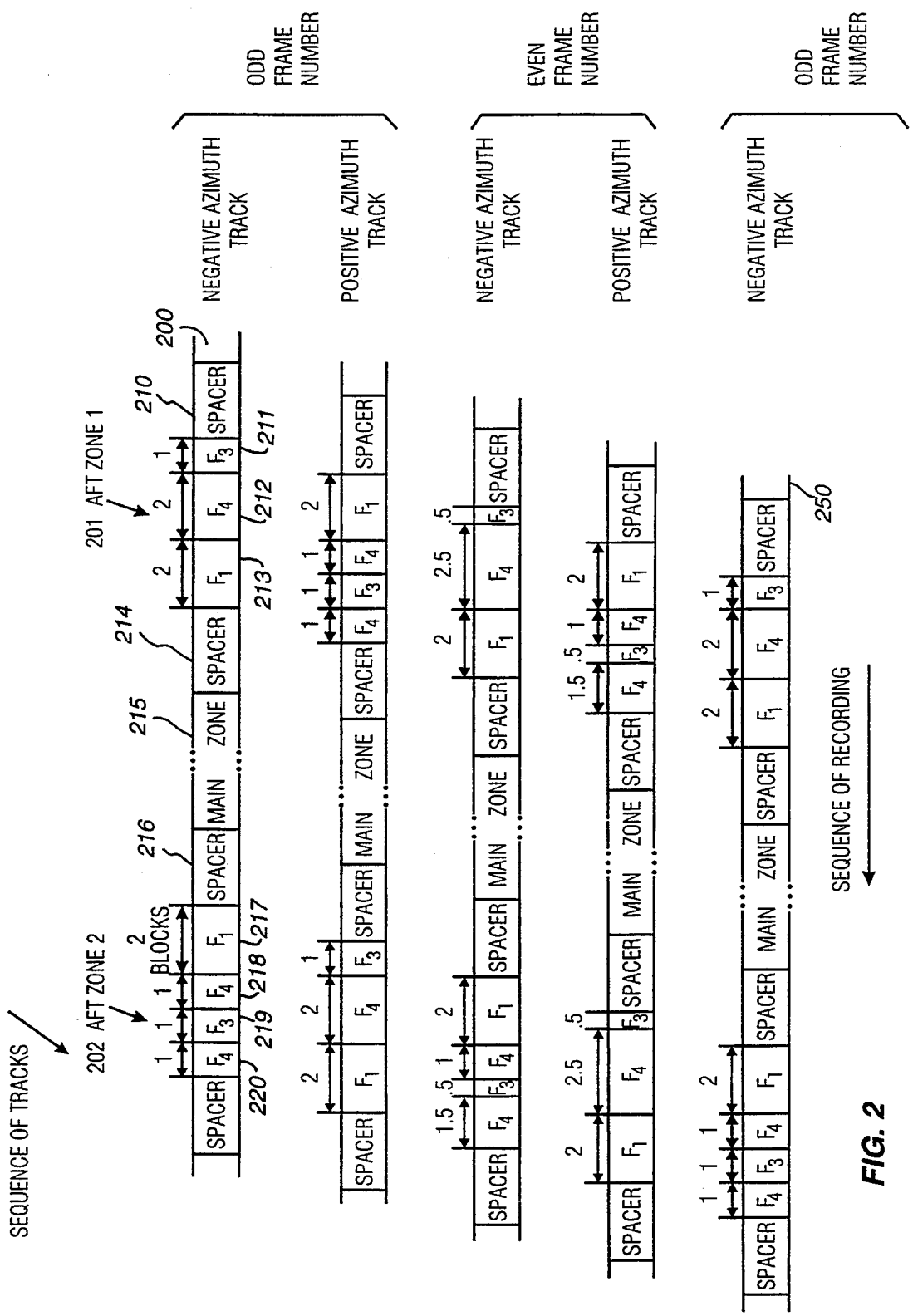
FIG. 2 is a conventional DDS standard tape showing the allocation of ATF signals to tracks.

FIG. 2 is a DDS standard tape 200 showing the allocation of ATF signals to tracks beginning with track 200, a−azimuth track (track 1 or track A) and half of a pair with+azimuth track to constitute an odd frame number. "Spacer" means three spacer blocks and "main zone" means 130 recorded blocks. A spacer 210 precedes ATF zone 1 201 containing ATF sync signals f3, f4, and f1 at 211, 212, and 213 respectively. There is another spacer 214, a main zone 215, and then another spacer 216. ATF zone 2 at 202 contains sync signals f1, f4, f3, and f4 at 217, 218, 219, and 220 respectively. The block sizes for each sync signal varies in the pattern shown until the pattern is repeated at tape 250. Thus, this allocation of ATF signals is repeated every four tracks and is dependent on frame number.

Figure 3:
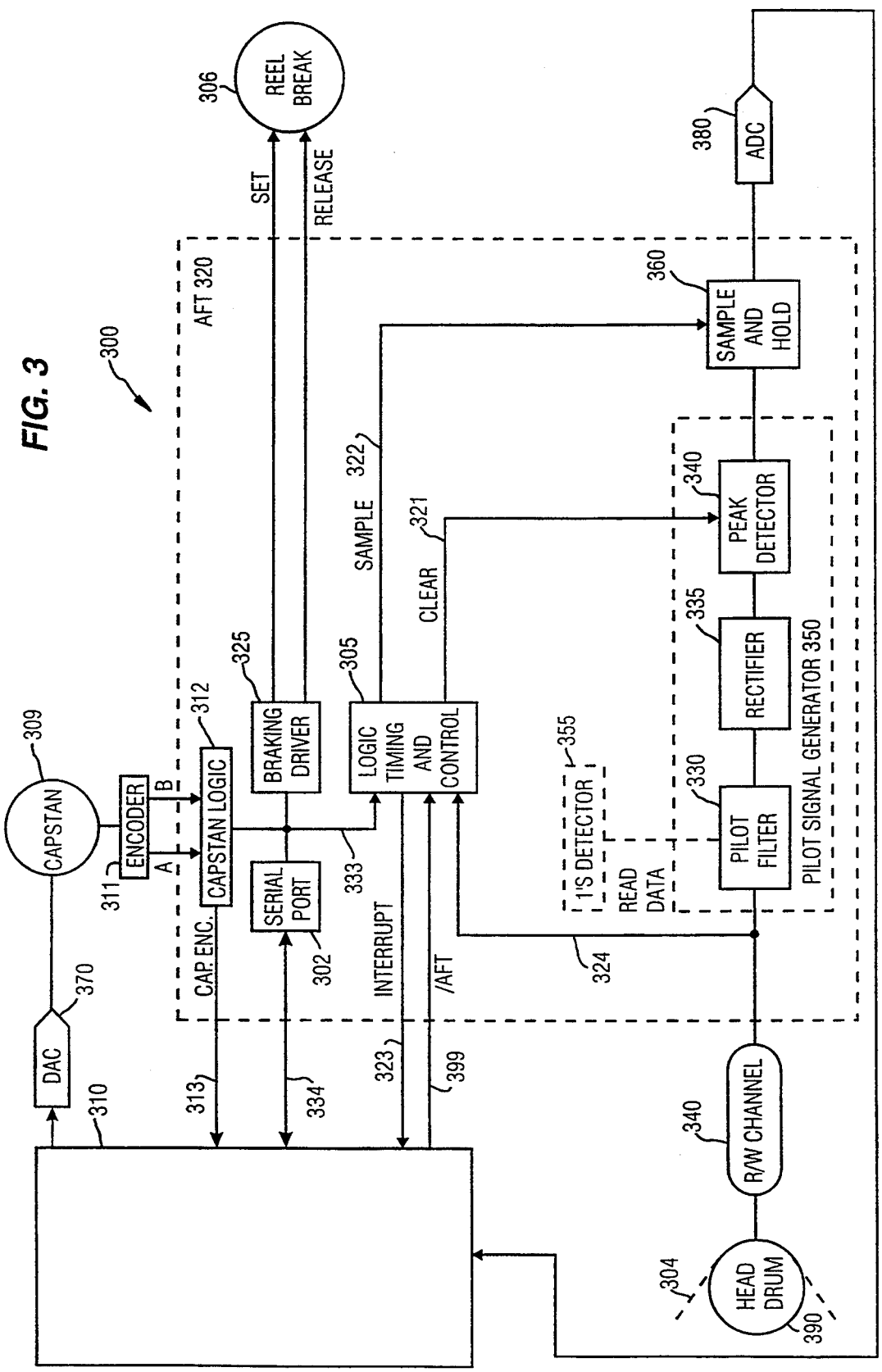
FIG. 3 is a schematic block diagram of a tape system including an embodiment of an automatic track follower (ATF) according to the present invention.

FIG. 3 is a schematic block diagram of a tape system 300 including an embodiment of an automatic track follower (ATF) 320 according to the present invention. ATF 320 includes a tracking logic, timing and control (LTC) unit 305 coupled to a serial port 302 (which in the preferred embodiment is a high-speed serial interface) via bus 333. LTC 305 generates timing strobes clear, sample, and interrupt via lines clear 321, sample 322, and interrupt 323. A braking driver 325 is also coupled to bus 333. Braking driver 325 is coupled to a reel brake 360 which controls the supply and take-up reels (not shown). Serial port 302 is coupled to a controller/formatter/processor (CFP) 310 by bus 334 (which in the preferred embodiment is a high-speed serial bus). A capstan 309 is coupled to CFP 310 through a digital-to-analog converter (DAC) 370. An encoder 311 is coupled to capstan 309. In the preferred embodiment, encoder 311 is a quadrature encoder generating A and B quadrature signals to a capstan logic unit 312 which is coupled to CFP 310 by CAP_ENC line 313. CFP 310 also provides a read-data signal over line 324 to LTC 305 and A tape 304 is in communication with a head drum 390 which is coupled to a read channel 340. A pilot signal generator 350 includes a low pass pilot filter 330 coupled to a rectifier 335 coupled to a peak detector 340. Pilot signal generator 350 is coupled to a sample and hold circuit 360 which is coupled to an analog-to-digital converter (ADC) 380 which is coupled back to CFP 310.

Broadly, when activated by an ATF timing signal through line 399 from CFP 310, LTC 305 detects the beginning of the ATF field in the read data stream and generates timing strobes to sample the adjacent track pilot signals and the on-track pilot signal. Each time LTC 305 generates a sample timing strobe, an interrupt is also generated and transmitted back to CFP 310. CFP 310 responds to the interrupt by performing an analog-to-digital conversion of the sampled pilot signal. CFP 310 measures the signals, computes the tracking error signal and performs other necessary tracking servo loop calculations. All these operations are performed digitally. Then, CFP 310 adjusts the control voltage to capstan 309 to maintain accurate tracking by converting the digital signal to an analog signal through DAC 370.

In conventional systems, the frequency and length of the ATF sync signal (f2 recorded only on track 1 and f3 recorded only on track 2) is detected to initiate the track following. In the present invention, LTC 305 detects the beginning of the ATF field by monitoring the digital read data. Therefore, the overall ATF operation is timed from the beginning of the ATF field rather than from the sync signal (which occurs later in the ATF field). After the beginning of the ATF field is detected, LTC 305 also detects the sync field and uses this additional timing information for more accurate control of the ATF timing. This then insures that good pilot signal samples are obtained for track following.

Because the length of the pilot servo bursts is small compared to the track location accuracy, it is not possible to time the strobes for sampling the pilot signal from absolute track location. Specifically, the pilot servo burst areas are two blocks long (about 60 $\mu$sec) and the absolute track location accuracy is ±two blocks along the track direction. Therefore, timing the sample strobes based on absolute track location cannot guarantee the reliable acquisition of samples from typical tapes. Detection of a pattern on the track provides absolute location of the track. However, the accuracy of the physical location of adjacent tracks is ±0.7 blocks. This tolerance must be considered when determining the location of the pilot servo bursts on adjacent tracks. The present invention utilizes timing information from two patterns on the track itself, namely the beginning of the ATF field and the ATF sync mark, to time strobes. This guarantees that accurate samples are taken on all tapes which meet specific standard tolerances.

Figure 4B:
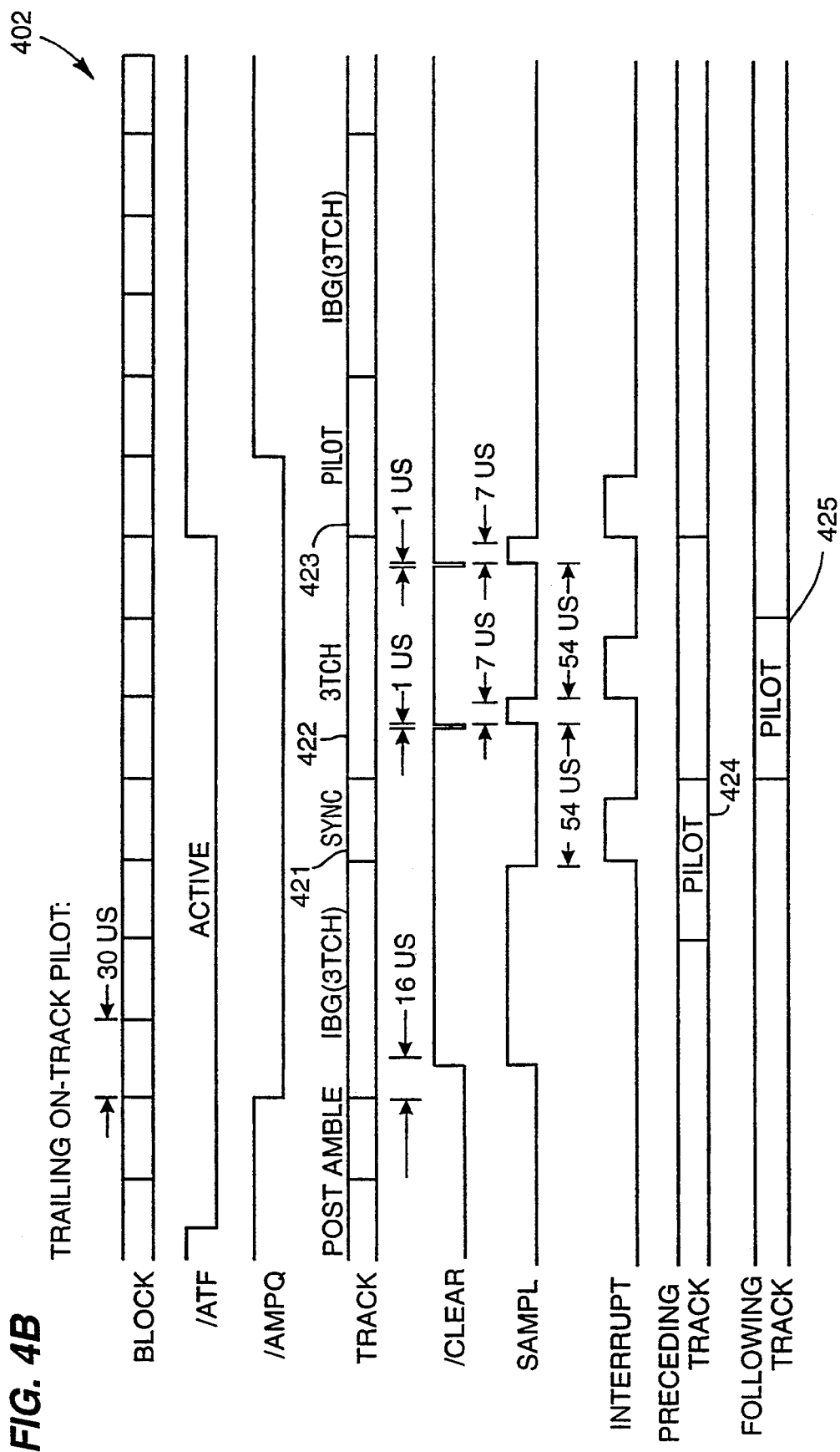
FIG. 4 shows the timing diagrams for sample strobe generation according to the preferred embodiment of the present invention.

FIG. 4 shows the timing diagrams for sample strobe generation according to the preferred embodiment of the present invention. FIG. 4 illustrates the nominal timing case wherein the location accuracy of adjacent tracks is perfect. Diagram 401 illustrates the case wherein the on-track pilot signal leads the off-track pilot signals. Diagram 402 illustrates the case wherein the on-track pilot signal trails the off-track pilot signals. For the leading on-track pilot case 401, in track 410, a pilot signal 411 precedes a sync signal 413, and they are separated by a 3-bit transition pattern "3Tch" 412. Tch denotes one code bit time which is approximately 83.3 ns for a 12 Mhz system. For case 401, pilot signal 411 may be missed if sampling is initiated by sync signal 413 since the sync signal comes after the pilot signal in time. Further, it may be difficult to generate sampling strobes for the preceding adjacent track pilot 414 and the following adjacent track pilot 415, which will always provide good samples over the ±0.7 block adjacent track location tolerance.

For the trailing on-track pilot case 402, a sync 421 precedes a pilot 423 and they are separated by a 3Tch pattern 422. Conventional track followers can easily sample pilot signal 423 since it comes after sync signal 421. However, conventional track followers will have difficulty generating sampling strobes for the preceding adjacent track pilot 424 and the following adjacent track pilot 425, which provide good samples over the ±0.7 block adjacent track location tolerance.

From FIG. 4, it can be seen that it is very difficult to generate timing strobes from the sync signal alone while guaranteeing that good pilot signal samples are obtained. The frequencies involved are as follows:

| Signal | Half-period | Period | Frequency |
| --- | --- | --- | --- |
| 8–10 encoded data | 1–4 Tch | | |
| Preamble, postamble, margin | 2 Tch | 0.167 $\mu$s | 6 MHz |
| IBG, space | 3 Tch | 0.500 $\mu$s | 2 MHz |
| B channel (−az) sync | 6 Tch | 1.000 $\mu$s | 1 MHz |
| A channel (+az) sync | 9 Tch | 1.500 $\mu$s | 666 KHz |
| Pilot signal | 36 Tch | 6.012 $\mu$s | 167 KHz |

Head-to-tape speed variation makes location accuracy even more difficult. The sync signal is 0.5 blocks long in even frames and 1.0 blocks long in odd frames.

In order to detect the beginning of the ATF field, broadly, the period between magnetic transitions on the tape is counted. A period is discriminated as being less than or equal to 3 code bits long ($\leq 3Tch$) versus greater than 3 bits long ($>3Tch$). The beginning of the ATF field is thus detected as the transition from an area having transitions spaced less than or equal to 3Tch to an area having transitions spaced greater than 3Tch.

In the preferred embodiment, the detection of the beginning of the ATF field and the pilot signal sampling are achieved by the present invention utilizing timing based on the timing diagrams of FIG. 4. Two different detection sequences are provided to accommodate ATF fields in the two cases: when the on-track pilot field precedes the off-track crosstalk fields and when the on-track pilot field follows the off-track crosstalk field, as shown in FIG. 4. When the /ATF signal is inactive (high), the ATF tracking logic is disabled and no ATF timing strobes are generated, no ATF sample available interrupts are generated, and the sync valid and sync invalid bits are cleared. After a timing window signal ("/ATF") is asserted by CFP 310, LTC 305 searches for the beginning of the ATF field and then generates the sampling strobes. The strobes are activated three times: once to capture the on-track pilot field, once to capture the off-track crosstalk pilot field from the previous track, and once to capture the off-track crosstalk pilot field from the following track. A processor interrupt is asserted each time the sample strobe is asserted. CFP 310 responds to the interrupt and performs an analog-to-digital conversion (ADC) of the sampled signal. Once the beginning of the ATF field is detected, the timing sequence of the clear, sample, and interrupt strobes goes to completion regardless of the state of the ATF window input. However, if the ATF window input goes low before the beginning of the ATF field is detected, CFP 310 resets the timing apparatus on LTC 305. The mode of operation just described is "track" mode, as it is most useful in following tracks after tracking has been acquired.

An alternate embodiment of the present invention is "software sampling" mode which is useful in initial track acquisition. In software sampling mode, when /ATF goes active (low), LTC 305 immediately takes a sample by generating the ATF timing strobes "clear", "sample", and "interrupt". CFP 310 responds by performing an analog-to-digital conversion of the sampled signal. CFP 310 then asserts a "clear sample available" control pulse bit, whereupon LTC 305 takes another sample. CFP 310 thus can collect a continuous stream of samples. These samples are analyzed to determine absolute track location and track-to-track offset location, and on-track positioning can be quickly acquired.

In one embodiment, CFP 310 generates a continuous sequence of strobes for taking additional samples.

In track mode, when/ATF goes active (low), LTC 305 searches for the beginning of the ATF field. Upon detection, the ATF timing strobes clear 420, sample 430, and the sample available interrupt 440 are produced. Beginning from when the beginning of the ATF field is detected, ATF 320 takes three samples at 2 block intervals, which are to sample the preceding track off-track crosstalk pilot signal, the following track off-track crosstalk pilot signal, and the on-track pilot signal. In some cases the on-track pilot precedes the off-track crosstalk pilot signals, and in other cases, it follows them. ATF 320 must be set for the proper type of field by setting the lead/trail bit in the main control register appropriately.

In an alternate embodiment, detection of the ATF field may be qualified by a "1's detector 355 (dashed-dot lines) in ATF 320. 1's detector 355 counts the number of transitions in ½ block times. If 172 transitions are counted within a ½ block time, the 1's detector asserts an output which is used to detect the preamble 1's field at the end of spacer 1 before the ATF zone 1 (FIG. 2). Thus, the ATF window may be opened during the sub data area (preceding the first ATF field) of the track. Note that the ATF window must be opened in the IBG 3 area of ATF zone 2 since there is no preamble field preceding ATF zone 2.

FIG. 5A is a schematic block diagram showing a detecting and sampling circuit 500 in one embodiment of the present invention. A pilot signal from a mark on a tape 504 which is in communication with a read head 516 on a head drum 507 is filtered by a low pass pilot signal filter 505 and full-wave rectified by rectifier 506. Detecting circuit 500 includes a peak detector 530 coupled to receive the filtered, rectified pilot signal. Peak detector 530 is coupled to a sample-and-hold circuit 510 which is coupled to a strobe generator 522. Strobe generator 522 is also coupled to peak detector 530 for clearing peak detector 530 to an initial state. Head drum 507 is further coupled to a discriminator 508 which is part of logic, timing, and control (LTC) unit 508. Discriminator 508 detects the presence or absence of 3Tch fields in the signal.

FIG. 5B is a schematic diagram of a circuit 500 combining the functions of peak detector 530 and sample-and-hold circuit 510. Circuit 500 includes a diode 518, and a capacitor 512 and a bleeder resistor 514 in parallel.

In operation, an input signal at 517 passes through a diode 518. Strobe generator 522 (FIG. 5A) generates strobes "clear" and "sample" to control detector circuit 500 by charging and discharging sample-and-hold circuit 510. The sample strobe strobes the filtered, full-wave rectified sample pilot signal to charge sample-and-hold circuit 510. Diode 518 allows the signal to charge capacitor 512 only if the signal is at a higher potential than the charge already present on capacitor 512, thereby providing a peak detection function. Bleeder resistor 514 prevents sample capacitor 512 from creeping up during long sampling periods. When the clear signal is asserted capacitor 512 is discharged.

FIG. 5C is a schematic block diagram of an embodiment of discriminator 508 (of FIG. 5A) which detects the 3Tch fields. In this embodiment, this is performed by a 3-bit transition period counter acting as counter 540 which is cleared each time a transition is detected on the tape, which is indicated by a low-going pulse on a read-data input 541. Counter 540 counts up on a master clock 550 (which runs at the code clock rate) and stops when it reaches 4. If a transition is detected when the count in counter 540 is less than 4, then 3Tch_last flag 545 is set, indicating that the time between the last two transitions was less than or equal to 3Tch. If a transition is detected when counter 540 is at 4, then flag 545 is reset.

The preferred embodiment does not use 3Tch_last flag 545 directly as an indication of the presence of a 3Tch field since a single erroneous transition can cause such a flag (3Tch flag) to be changed. Therefore this embodiment utilizes a filtering process by means of a filter 555. Every time 3Tch_last flag 545 changes state, filter 555 (in this embodiment, a 4-bit filter counter) is started. Filter counter 555 counts out 0.5 μsec, if 3Tch_last flag 545 is stable for this period, then 3Tch flag is set to the same state as 3Tch last flag 545. Thus 3Tch is a reliable indicator of field type.

Further, the 3Tch field is detected 0.5 μsec from when the first 3Tch transition comes in, allowing sample-and-hold circuit 510 to be closed before the transition shock wave can propagate through pilot signal filter 555.

Figure 5D:
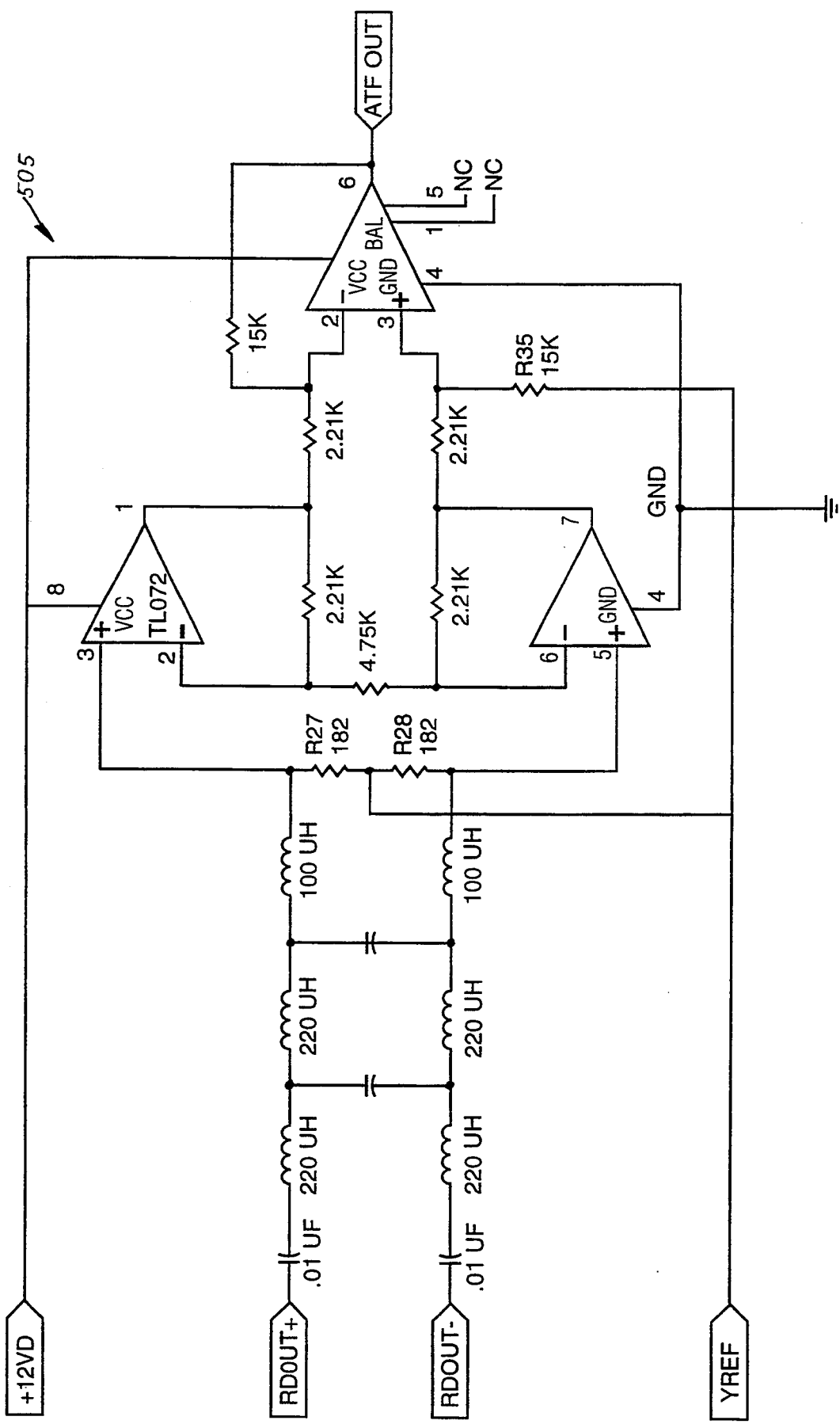
FIG. 5D shows an exemplary circuit for a pilot signal filter according to the present invention.
Figure 5E:
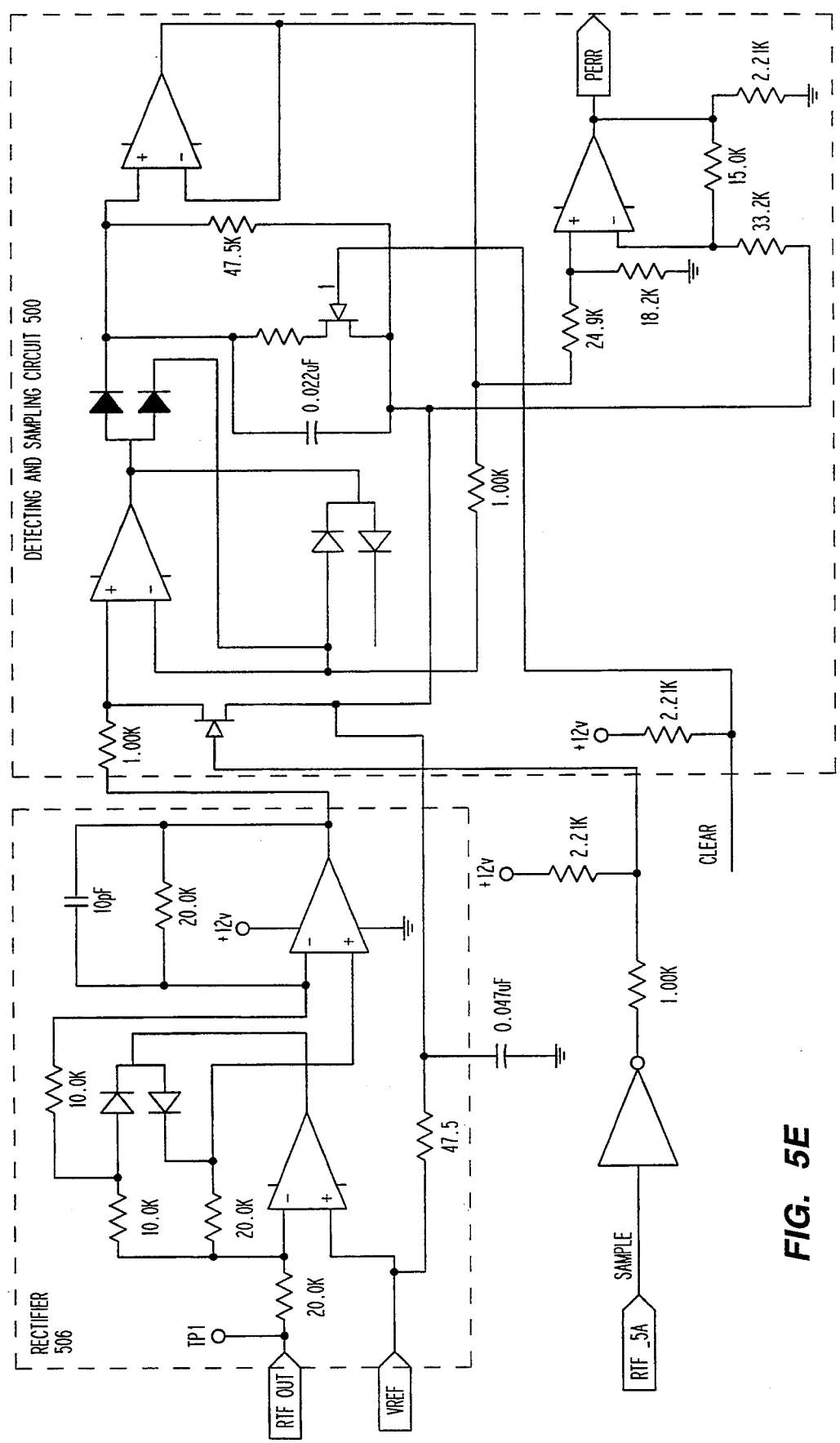
FIG. 5E shows exemplary circuits for a rectifier and a detecting and sampling circuit according to the present invention.

FIG. 5D shows an exemplary circuit for pilot signal filter 505 and FIG. 5E shows exemplary circuits for rectifier 506 and detecting and sampling circuit 500.

Following is a description of the preferred embodiment of the ATF function as implemented in ATF 320. Reference is made to the Figures for ease of understanding.

ATF TRACK MODE, LEADING ON-TRACK PILOT

This embodiment for implementing ATF is for leading on-track pilot signals as shown for example in FIG. 4 at 401.

(POINT AAA) Clear is active and sample and interrupt are inactive. Wait for the input signal/ATF to go active, indicating that read head 190 is approaching the approximate beginning of an ATF field (as shown for example in FIG. 2). /ATF defines a window for ATF activity. @ The leading edge of /ATF should be calculated to be 2.5 blocks before the ideal beginning of the ATF field, to allow for the ±2.15 block tolerances. The first ATF area of any track has to be defined by looking for a 1Tch (postamble) since there is no easy way to know when to assert /ATF in a 3Tch field. This is achieved by a counter (included in this embodiment in ATF 320) counting up to 160 counts of /RDAT in 170 clock ticks. For the second/ATF area, CFP 310 keeps track of when to open the ATF window. When/ATF is asserted for the second ATF field, read head 190 should be in a 3Tch field.

(POINT BBB) If 1's detector 355 is enabled, wait for an all 1's field to be detected (as described above) and then wait for a 3Tch field.

(POINT CCC) Wait for the end of the 3Tch field. The next field should be the on-track pilot (see for example FIG. 4 at 401).

(POINT DDD) Wait 22 μsec. This spaces into the middle of the on-track pilot (FIG. 4). Then de-assert clear and assert sample. Wait 6.67 μsec, de-assert sample and set the sample available interrupt. This locks in a peak-detected sample of the tracking pilot signal. CFP 310 should respond to the interrupt by performing an AD conversion of the sample. The interrupt should be cleared as soon as the AD converter has taken its sample.

(POINT EEE) Wait for the next 3Tch field which will come at the end of the on-track pilot field. It also is the nominal beginning of the preceding track's off-track crosstalk pilot field.

(POINT FFF) Wait 21 μsec. This spaces past the shock wave that the 3Tch signal 412 causes in pilot signal filter 555, but is before the arrival of the sync field 413. Then de-assert clear and assert sample. Wait 6.67 μsec, de-assert sample and set the sample available interrupt.

(POINT GGG) Wait 35.8 μsec, then de-assert clear and assert sample. Wait 6.67 μsec, de-assert sample and set the sample available interrupt. CFP 310 should respond to the interrupt by doing an AD conversion of the sample. The interrupt should be cleared as soon as the AD converter has taken its sample.

(POINT KKK) At this point, the operation on the leading on-track pilot is completed. When stop-time has occurred, ATF tracking logic 305 is reset and returned to (POINT AAA).

TRACK MODE, TRAILING ON-TRACK PILOT

This embodiment for implementing 3Tch detection is for when the on-track pilots trail the off-track crosstalk pilot signals as shown for example in FIG. 4 at 402.

(POINT AAAA) Clear is active and sample and interrupt are inactive. Wait for the input signal/ATF to go active, indicating that read head 190 is approaching the approximate beginning of an ATF field (as shown for example in FIG. 2). /ATF defines a window for ATF activity. The leading edge of /ATF should be calculated to be 2.5 blocks before the ideal beginning of the ATF field, to allow for the ±2.15 block tolerances. The first ATF area of any track has to be defined by looking for a 1Tch (postamble) since there is no easy way to know when to assert /ATF in a 3Tch field. This is achieved by a counter (included in this embodiment in ATF 320) counting up to 160 counts of /RDAT in 170 clock ticks. For the second/ATF area, CFP 310 keeps track of when to open the ATF window. When/ATF is asserted for the second ATF area, read head 190 should be in a 3Tch field. Note that in the case of the second ATF area, wait 15.4 μsec after /ATF is asserted (one-half a block).

(POINT BBBB) If 1's detector 355 is enabled, wait for an all 1's field to be detected (as described above) and then wait for a 3Tch field.

(POINT CCCC) Wait 15.4 μsec into the 3Tch field, then de-assert clear and assert sample. Wait for the end of the 3Tch field. The next field should be the sync field (see FIG. 4). De-assert sample and set the sample available interrupt. This closes off the sample before it can be contaminated by the shock wave of the sync field through pilot signal filter 505. CFP 310 should respond to the interrupt by performing an AD conversion of the sample. The interrupt should be cleared as soon as the AD converter has taken its sample.

(POINT DDDD) Wait 52.5 μsec to space to the center of the off-track crosstalk pilot field of the following track.

(POINT EEEE) Assert clear for 0,833 μsec, clearing peak detector sample-and-hold capacitor 512. Then assert sample.

(POINT FFFF) Wait 6.66 μsec, at the ideal center of the off-track crosstalk pilot field of the following track, de-assert sample and set the sample available interrupt. CFP 310 should respond to the interrupt by performing an AD conversion of the sample.

(POINT GGGG) Wait 52.5 μsec to space into the center of the on-track pilot field.

(POINT HHHH) Assert clear for 0.833 μsec, clearing peak detector sample-and-hold capacitor 512. Then assert sample.

(POINT IIII) Wait 6.66 μsec, at the ideal center of the following on-track pilot field, de-assert sample and interrupt and set the sample available interrupt. CFP 310 should respond to the interrupt by performing an AD conversion of the sample.

(POINT JJJJ) At this point, the operation on the trailing on-track pilot is completed. When stop-time has occurred, ATF tracking logic 305 is reset and returned to (POINT AAAA).

ATF SOFTWARE SAMPLING MODE (POINT AA) Clear is active and sample and interrupt are inactive. Wait for the input signal/ATF to go active, indicating that read head 190 is approaching the approximate beginning of an ATF field (as shown for example in FIG. 2). /ATF defines a window for ATF activity. @ The leading edge of /ATF should be calculated to be 2.5 blocks before the ideal beginning of the ATF field, to allow for the ±2.15 block tolerances. When /ATF is asserted, read head 190 should be in a 3Tch field (as shown for example in FIG. 4).

(POINT BB) Wait 0.83 μsec and then de-assert clear and assert sample.

(POINT CC) At 6.66 μsec later, de-assert sample and assert interrupt. This locks in a sample of the peak-detected ATF pilot signal, on which CFP 310 may perform an analog-to-digital conversion (ADC).

(POINT DD) If CFP 310 asserts the clear sample available interrupt control pulse bit, assert clear and jump to (POINT BB). CFP 310 can perform continuous conversions by starting a new AD conversion as soon as the last one is completed, and issues a clear sample available interrupt to ATF 320 as soon as the conversion is started. This can be done without interrupts or even any polling of ATF 320.

(POINT EE) If /ATF goes inactive at any time ATF tracking logic LTC 305 is reset and returned to (POINT AA). Otherwise, wait for the clear sample available interrupt control pulse.

ATF WINDOW GENERATION

As stated above, CFP 310 provides a control signal (/ATF) which indicates a window for ATF activity. In one embodiment of the invention, /ATF is generated from a high-speed output (HSO) (see related patent application Ser. No 07/741,783 describing the overall DDS/DAT system, which is hereby incorporated by reference). /ATF assertion is a low allowing ATF tracking logic 305 to operate. The first ATF window can be placed approximately, utilizing 1's detector 355 to detect the preamble preceding the first ATF field. In the preferred embodiment, software implementing ATF utilizes timing information acquired from actual sync detection (i.e., the initial sample available interrupt in track mode) to accurately place the second ATF window relative to the actual track position.

An embodiment of this invention can be found in Digital Data Tape Storage System Model RB100 manufactured by R-Byte of San Jose, Calif.

While the above description provides a full and complete description of the preferred embodiments of the present invention, various modifications, alternate constructions, and equivalents may be employed while still remaining within the scope of the invention. For example, the preferred embodiment of the logic, timing, and control unit is implemented in a 1.2 micron CMOS gate array ASIC, however, implementations in any suitable technology such as standard cells, full-custom integrated circuits, and high-density programmable logic are within the scope of the invention. Further, implementation which include other functions within a single-chip ATF servo such as a DDS formatter are also within the scope of the invention. Also, the timing in the examples is for a 12 MHz code clock rate, however, this invention can utilize any clock rate, particularly suitable is the 9.408 MHz rate typical for audio tape systems. Therefore, the above description and illustrations should not be construed as limiting the scope of the invention which is defined by the following claims.

What is claimed is:

1. In a digital data tape storage system having a read/write head in communication with a magnetic tape including tracks having at least one automatic track following (ATF) field having a period being greater than three code bit times preceded by a field having a period being less than or equal to three code bit times, an ATF field detector comprising:

a discriminator, said discriminator comprising circuitry for digitally discriminating between areas of the magnetic tape having less than or equal to three code bit times and having greater than three code bit times, said discriminator coupled to the read/write head; and signal generating means for signalling a boundary between an area having less than or equal to three code bit times and an area having greater than three code bit times coupled to said discriminator, said signal generating means thereby signaling the detecting of an ATF field.

2. In a digital data tape storage system having a magnetic tape including an automatic track following (ATF) field, a method for detecting the beginning of the ATF field comprising:

(a) generating an ATF window;
(b) counting periods between magnetic transitions on the tape in said ATF window;
(c) digitally discriminating between said periods being less than or equal to three code bits long and periods being greater than three code bits long, thereby determining the beginning of the ATF field as the boundary between a field having magnetic transitions spaced less than or equal to three code bits long and a field having magnetic transitions spaced greater than three code bits long; and
(d) signalling the beginning of the ATF field.

3. The method of claim 2 wherein the magnetic tape has a spacer field including a preamble 1's field before a first ATF field and wherein step (a) comprises counting how many "1'"s occur in a one-half block time until one hundred seventy-two "1'"s have been counted, thereby detecting the preamble 1's field before the first ATF zone and thereby allowing a sample window to be open during the spacer field.

4. The method of claim 2 wherein the magnetic tape has a spacer field including an interblock gap (IBG) field 1's field before a second ATF field and wherein step (a) comprises counting how many "1'"s occur in a one-half block time until one hundred seventy-two "1'"s have been counted, thereby detecting the IBG 1's field before the second ATF zone and thereby allowing a sample window to be open during the spacer field.

5. In a digital data tape storage system having a tape driver and a code clock for transporting and controlling a magnetic tape having data tracks, an ATF field including sync marks and tracking pilot marks, and a read/write channel coupled to a read/write head in communication with the tape and providing pilot signals from the pilot marks and a read-data signal, an ATF field detecting/sampling circuit comprising discriminator means, coupled to the read/write channel, for detecting the beginning of the ATF field; sample-and-hold circuit means, coupled to said discriminator means, for sampling and holding the pilot signals; and strobe generator means for generating a clear strobe for clearing said detecting/sampling circuit by discharging said sample-and-hold circuit means, a sample strobe for charging said sample-and-hold circuit means with a pilot signal, and an interrupt strobe for bleeding said sample-and-hold circuit means, a method for detecting a three code bit time field comprising:

(a) detecting magnetic transitions on the tape;

(b) clearing said counter means each time one of said magnetic transitions is detected on the tape, a first magnetic transition being indicated by the read-data signal;

(c) counting up and stopping at a count of four by said counter means if one of said magnetic transitions has been detected when the count in said counter means is less than four;

(d) setting a last flag indicating that the time between two consecutive of said magnetic transitions was less than or equal to three code bit times; and (e) resetting said counter means if one of said magnetic transitions is detected when said counter means is at four.

6. The method of claim 5 further comprising a pilot signal filtering process, the pilot signal filtering process comprising:

counting out a predetermined period every time the last flag changes state by said counter means; and setting a first flag to the same state of the last flag if the last flag is stable for the predetermined period.

7. The method of claim 6 wherein said predetermined period is sufficiently short such that the three code bit time field is detected after a first three bit time transition (sync signal), thereby allowing said sample-and-hold circuit means to close before a transition shock wave can propagate through said pilot signal filtering step.

* * * * *